United States Patent [19]

Green et al.

[11] Patent Number: 5,117,581
[45] Date of Patent: Jun. 2, 1992

[54] PALLET SYSTEM FOR CONTAINER-GROWN PLANTS

[75] Inventors: James L. Green, Corvallis; Robert J. Schnekenburger, Monmouth, both of Oreg.

[73] Assignee: State of Oregon acting by and through the Oregon State Board of Higher Education on behalf of Oregon State Universities, Eugene, Oreg.

[21] Appl. No.: 446,230
[22] Filed: Dec. 4, 1989
[51] Int. Cl.⁵ .............................................. A01G 9/02
[52] U.S. Cl. ........................................ 47/19; 47/79; 47/87; 47/86
[58] Field of Search .................. 47/18, 19, 84, 81, 25, 47/79, 87, 86

[56] References Cited

U.S. PATENT DOCUMENTS

| | | | |
|---|---|---|---|
| 1,931,602 | 10/1933 | Colman | 47/25 |
| 2,567,706 | 9/1951 | Hannum | 47/86 |
| 3,106,801 | 10/1963 | Risacher | 47/19 |
| 3,147,569 | 9/1964 | Murguia | 47/73 |
| 3,686,792 | 8/1972 | Barfield . | |
| 4,161,193 | 7/1979 | Freychet | 47/19 |
| 4,177,604 | 12/1979 | Friesen . | |
| 4,183,176 | 1/1980 | Barfield . | |
| 4,211,037 | 7/1980 | Green . | |
| 4,226,048 | 10/1980 | Molnar | 47/81 |
| 4,242,835 | 1/1981 | Sorribes | 47/84 |
| 4,279,101 | 7/1981 | Leroux . | |
| 4,287,682 | 9/1981 | Browne | 47/81 |
| 4,531,324 | 7/1985 | Yang | 47/81 |
| 4,546,571 | 10/1985 | Scrivens . | |
| 4,584,791 | 4/1986 | Wolf . | |
| 4,729,189 | 3/1988 | Whitcomb | 47/79 |
| 4,995,192 | 2/1991 | DeWid | 47/25 |

FOREIGN PATENT DOCUMENTS

| | | | |
|---|---|---|---|
| 70858 | 6/1892 | Fed. Rep. of Germany | 47/19 |
| 969317 | 12/1950 | France | 47/18 |
| 412853 | 7/1934 | United Kingdom | 47/19 |
| 2095083 | 9/1982 | United Kingdom | 47/81 |
| 2137464 | 10/1984 | United Kingdom | 47/18 |

OTHER PUBLICATIONS

Buclon, "Heating of Greenhouses Using Plastic Ducts on the Ground," Plastic Culture, vol. 27 (1975), pp. 33-37.
Dubois, "Flexible tube Soil Heating," Plastics in Agriculture (1978), Applied Science Publications, pp. 111, 113.
Ball, "Labor Saving at Burnaby Lake," Grower Talks (Sep. 1983) pp. 20-24.
"Ebb & Flow makes Profits Grow," Grower Talks (May 1989) p. 123.
"Growth by design," Van Wingerden advertisement, Grower Talks (May 1989), p. 53.
"Lerio's 1989 New Product Line-up," advertisement, American Nurseryman (Mar.-Apr. 1989), p. 169.
"Plasti-Vac 3-in-1 watering tray," advertisement, Grower Talks (May 1989), p. 52.
"Introducing a major innovation in self-watering plant pots," decor advertisement, Horitculture, vol. 67 (Sep. 1989), p. 9.
van de Werken, "A New Way With Containers," American Nurseryman (Jul. 1989), pp. 43-51.
Whitcomb et al., "An Insulated Pallet to Reduce Labor Costs and Temperature Stress in Container Plant Production," International Plant Propagation Society (1984) pp. 500-506.
"The Insulated Pallet," Plant Production in Containers, Lacebark Publications (1984), pp. 488-494.
Balligand, "Experience Gained in France on Heat Recovery From Nuclear Plants for Agriculture and Pisciculture," Nuclear Technology, vol. 38 (1978), pp. 90-96.

Primary Examiner—Henry E. Raduazo
Attorney, Agent, or Firm—Klarquist, Sparkman, Campbell, Leigh & Whinston

[57] ABSTRACT

The system includes an efficient, closed irrigation system in conjunction with insulating components for minimizing the harmful effects of extreme changes in ambient temperature, moisture and chemical concentrations in plant containers. Mechanisms are provided for permitting a single pallet, or a single plant within a pallet, to be readily removed from an integrated plurality of pallets without interfering with irrigation of the plants that are contained in the remaining pallets.

16 Claims, 14 Drawing Sheets

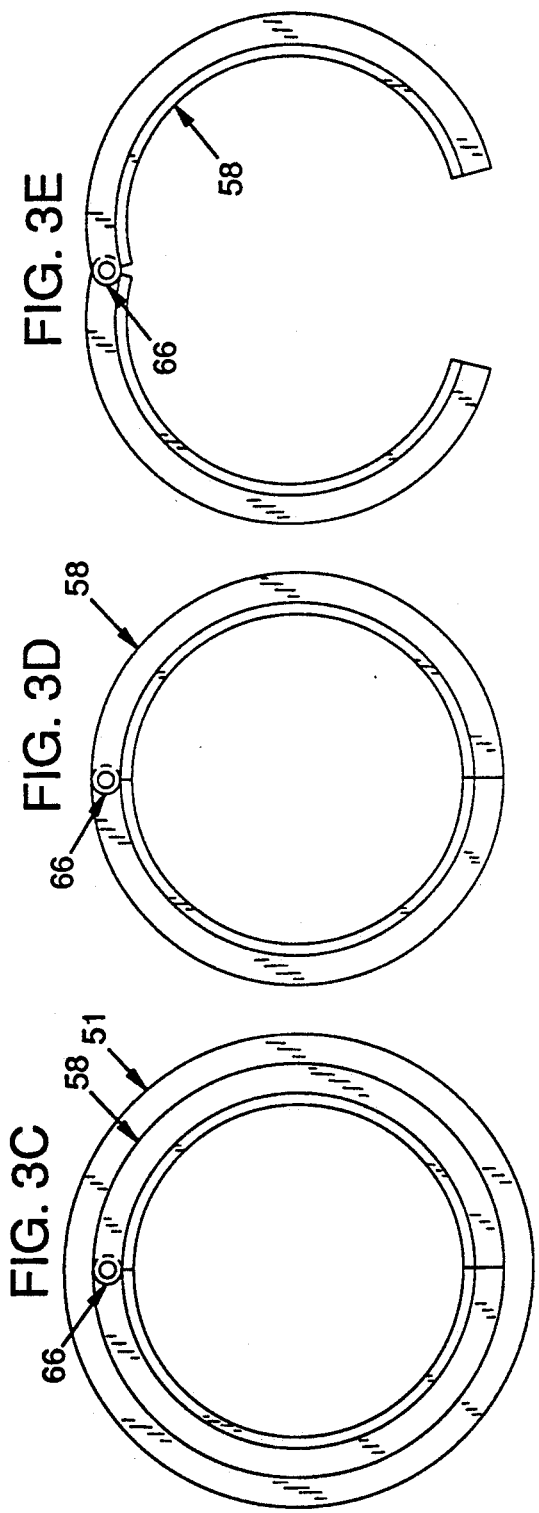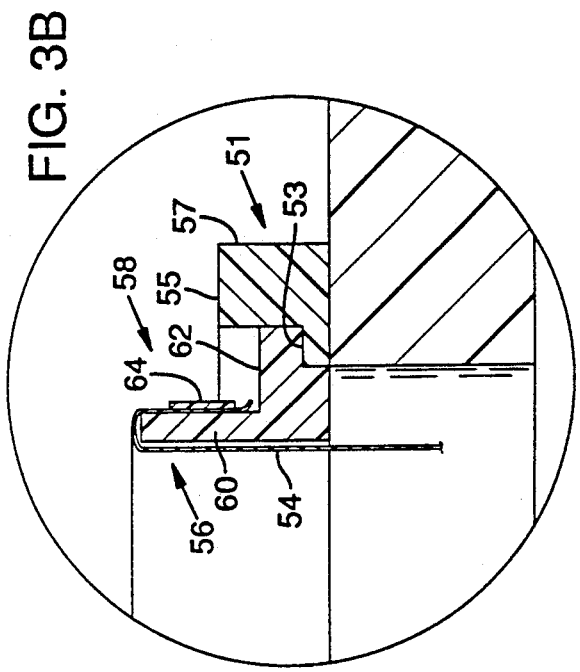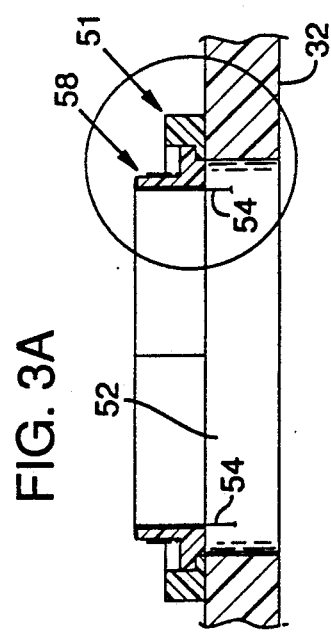

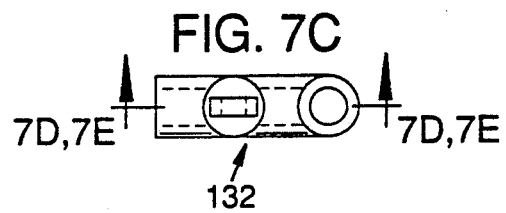
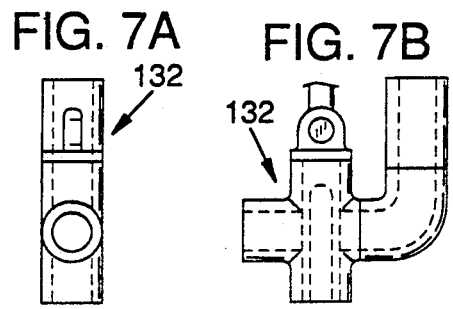
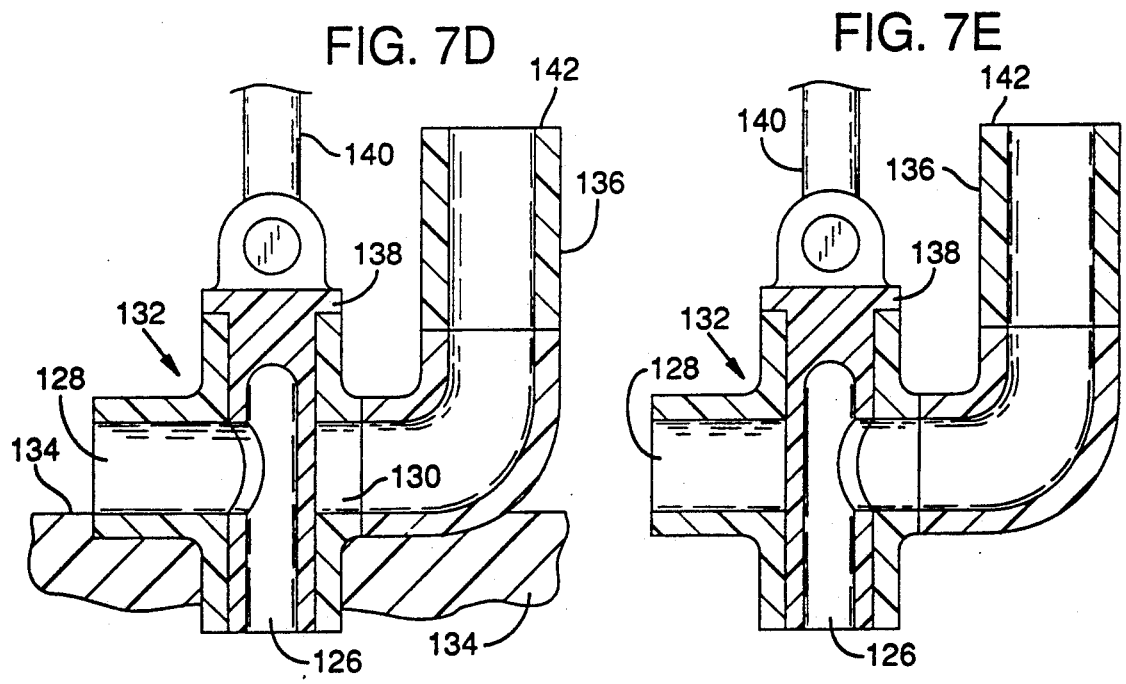

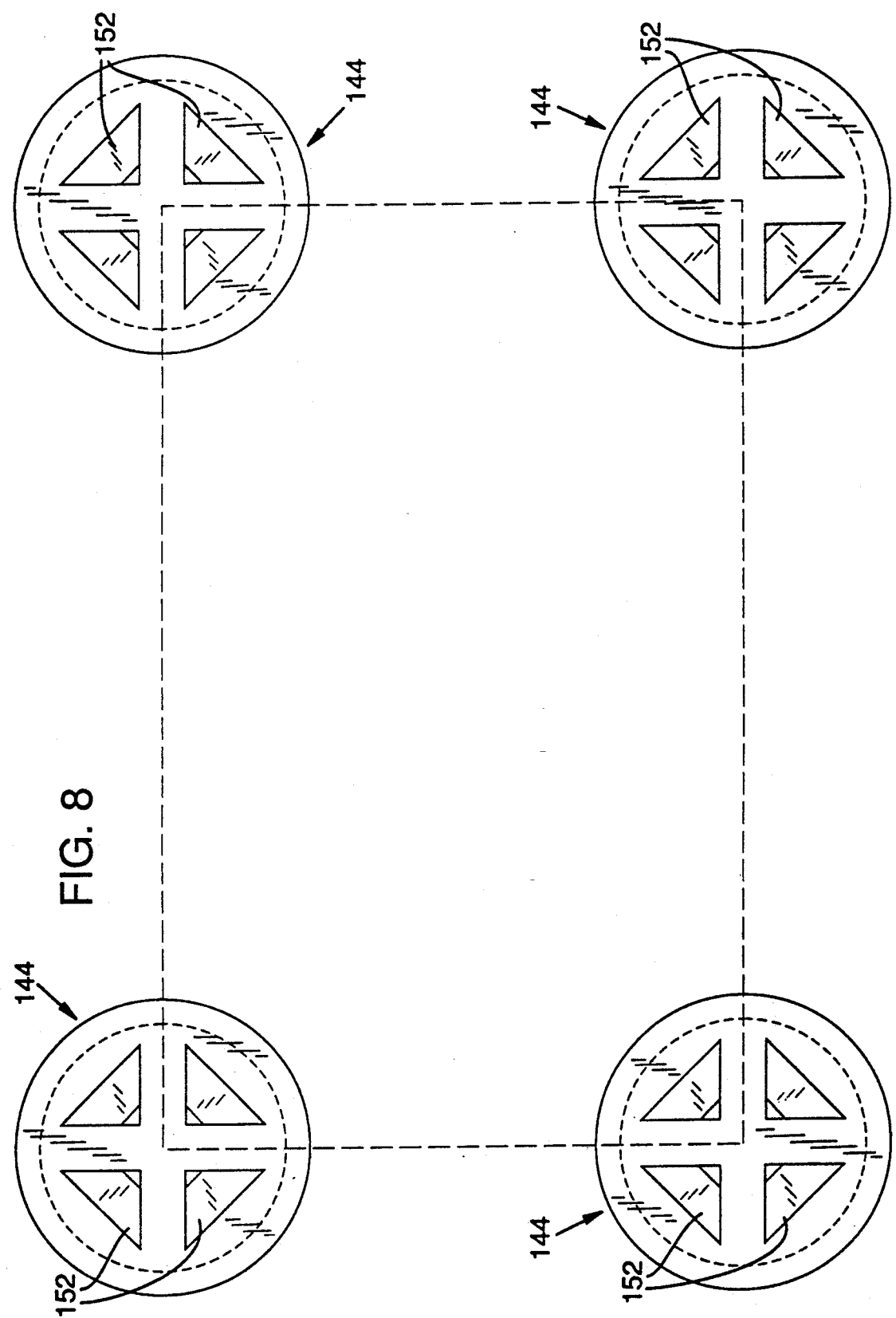

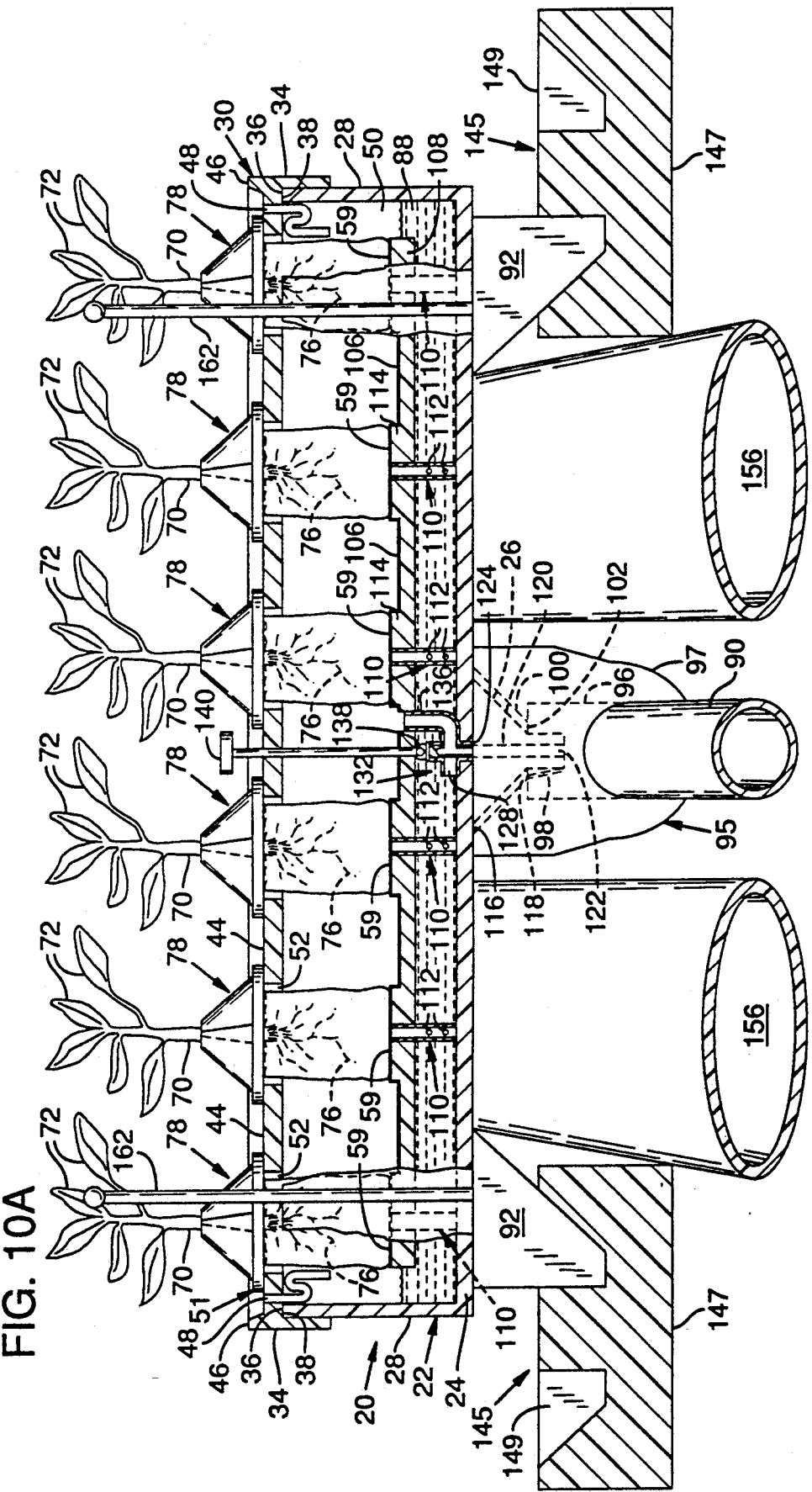

PALLET SYSTEM FOR CONTAINER-GROWN PLANTS

TECHNICAL FIELD

This invention pertains to systems for growing and handling plants.

BACKGROUND INFORMATION

Production of container-grown plants generally involves applying production solutions, such as water and liquid fertilizers, to individual containers with open root zones (that is, an open top surface and a draining bottom surface). Solutions are applied to the top surface of the open root zone by either overhead irrigation or drip irrigation techniques. Alternatively, the bottom surface of the root zone may be irrigated by capillary or sub-irrigation techniques. Examples of overhead spray or drip-watering techniques are disclosed in U.S. Pat. No. 4,584,791 (Wolf) or U.S. Pat. No. 4,177,604 (Friesen). Examples of such irrigation systems are found in the following U.S Pat. No. 4,729,189 (Whitcomb); U.S. Pat. No. 4,546,571 (Scrivens); U.S. Pat. No. 4,279,101 (Leroux); U.S. Pat. No. 4,211,037 (Green); U.S. Pat. No. 4,183,176 (Barfield); and U.S. Pat. No. 3,686,792 (Barfield).

Irrespective of the technique used for delivering water and nutrients to the container-grown plants, it is generally desirable to supply water to the plants in a manner that minimizes water loss through leakage, overspraying or evaporation. Preferably, irrigation systems for container-grown plants should be "closed", so that any applied water that is not retained by the plant containers is saved and recirculated.

Individual pallets for container-grown plants should be configured for integration with large numbers of pallets that are served by a single irrigation system. Moreover, individual pallets should be constructed so that they are readily removed from the irrigation system, and so that removal of one pallet does not interfere with the irrigation of the plants in the remaining pallets. Moreover, individual pallets should be constructed so that removal of one or more plants from the pallet does not interfere with irrigation of the plants remaining in the pallet. Preferably, the pallets should be lightweight and easy to handle.

Plant growth is enhanced whenever the plants are protected from extreme ambient temperature changes. Accordingly, a pallet or similar device for container-grown plants should provide a mechanism for insulating the plants from extreme changes in ambient temperature.

SUMMARY OF THE INVENTION

This invention is directed to a pallet system for container-grown plants that includes an efficient, closed irrigation system in conjunction with insulating components for minimizing the harmful effects of extreme changes in ambient temperature, moisture and chemical concentrations in the containers.

The closed-irrigation, insulated pallet system of the subject invention provides stable chemical and physical gradients within the root zone. Such a stable system permits successful integration of beneficial microorganisms, such as biological controls and mycorrhizal fungi.

Moreover, the system of the present invention includes mechanisms for permitting a single pallet, or a single plant within a pallet, to be readily removed from an integrated plurality of pallets without interfering with irrigation of the plants contained in the remaining pallets.

The system of the present invention includes a pallet that generally comprises a base that has a bottom and four side walls. A top is attached to the pallet base. Plants are contained in flexible porous containers that are secured to the pallet in a manner such that the contained roots are disposed in an enclosed compartment that is defined by the pallet top and base. The pallet top and base are insulated to protect the plants from extreme changes in ambient air temperature. In this regard, the pallet base carries a water reservoir that buffers or minimizes the effects of temperature changes by acting as a heat source or sink. Moreover, the pallet base 22 is in conductive contact with the underlying earth or with hot water bags for further buffering of temperature fluctuations within the root compartment.

As another aspect of this invention, the reservoir is coupled with a capillary mat assembly for providing root sub-irrigation of the contained plants.

As another aspect of this invention, the pallet is constructed so that the reservoir may be readily drained. Moreover, a single pallet may be disconnected from a main water supply pipe without interfering with the irrigation of the plants held by other pallets that may be connected to the water pipe.

As another aspect of this invention, a reusable holder is provided for the purpose of securing the plants to the pallets. The holder may be opened for easy removal of grown plants.

As another aspect of this invention, an anchoring mechanism is provided to facilitate positioning a plurality of pallets in a well-ordered arrangement for establishing an integrated system of pallets. To this end, individual pallets are configured for mechanized movement into and out of the integrated system of pallets.

As yet another aspect of this invention, a mechanism is provided for controlled application of foliar pesticides or growth regulators to the plants that are carried by the pallets.

As yet another aspect of this invention, an alternative embodiment of a pallet is adapted for use in retail establishments.

As yet another aspect of this invention, hot water bags, in the form of black polyethylene tubes, are placed between the pallet feet beneath the pallet base on a greenhouse floor to control the root compartment temperature.

BRIEF DESCRIPTION OF THE DRAWINGS

FIGS. 3A–3E illustrate the annular holder used to secure a plant container to a pallet.

FIGS. 7A–7E are detailed illustrations of the mechanisms for controlling water flow into the capillary irrigation system.

FIG. 8 is a diagram of a preferred method of supporting pallets at selected locations on the ground.

FIG. 10A is a side view, in partial cross-section, of a pallet of the present system showing a pallet placed upon a greenhouse floor and including hot water bags extending beneath the pallet.

FIG. 13 is a pictorial view of an alternative embodiment of a pallet of the present system, which embodiment is useful for handling and displaying plant containers at retail establishments or the like.

DETAILED DESCRIPTION

Figure 1:
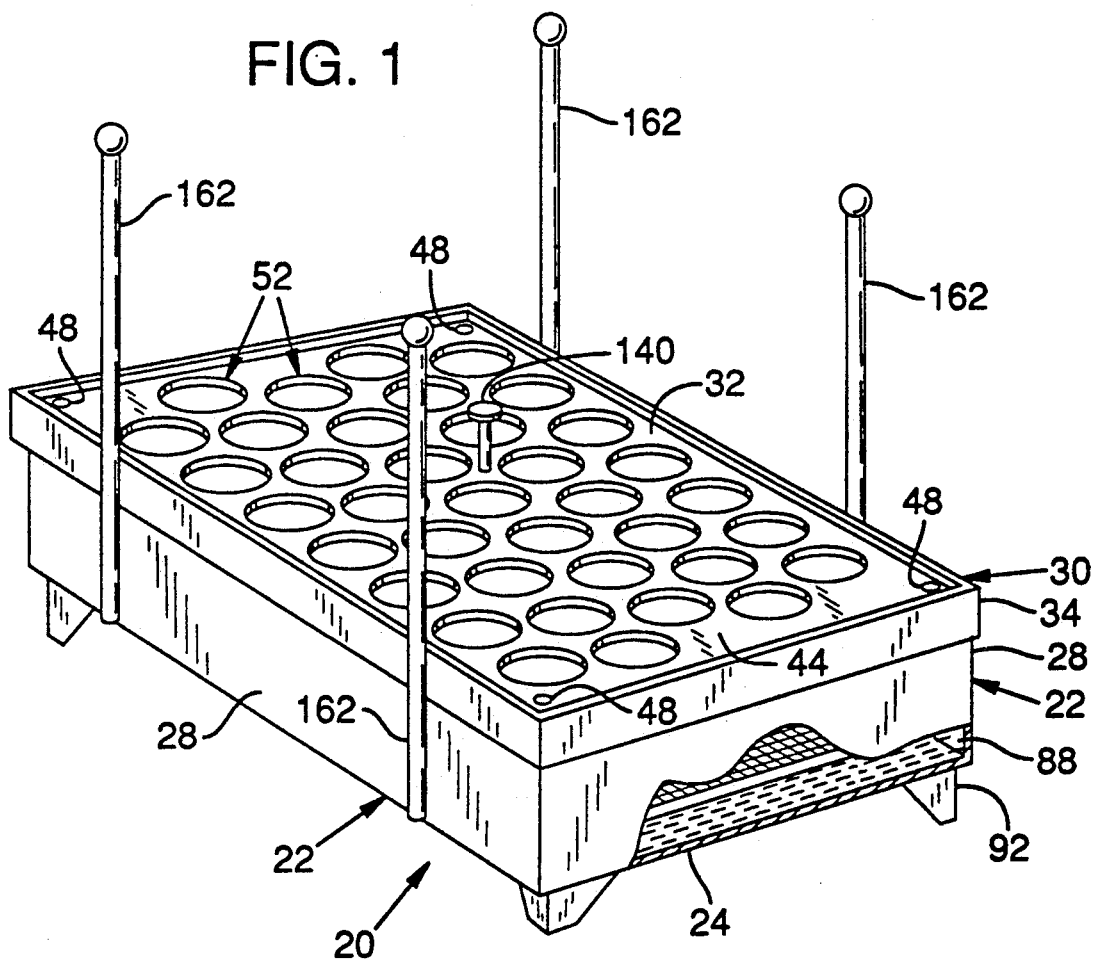
FIG. 1 is a perspective view of a pallet formed in accordance with system of the present invention.
Figure 2:
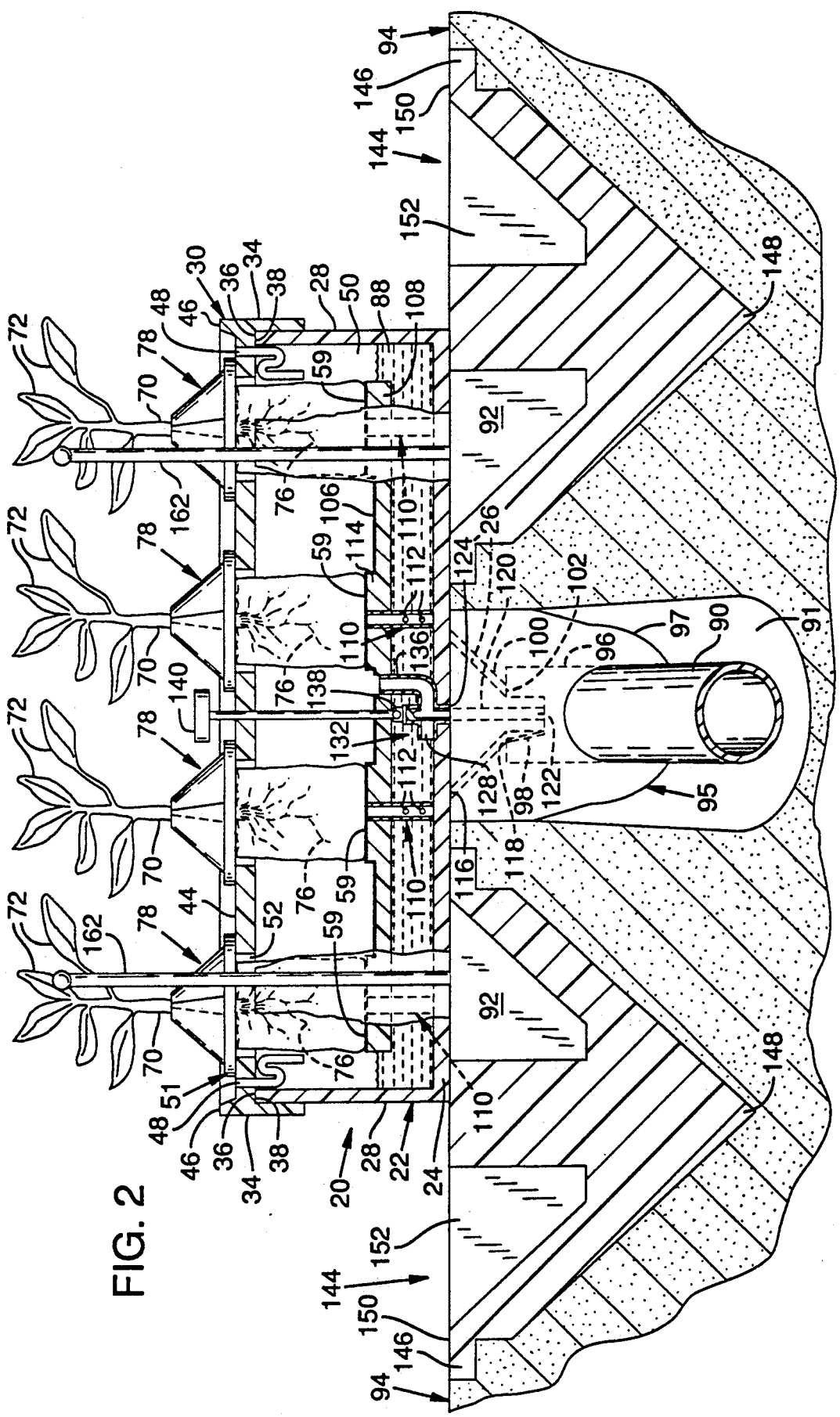
FIG. 2 is a side view, in partial cross-section, of the pallet placed on the ground and carrying container-grown plants.

As shown in FIGS. 1 and 2, a pallet 20, formed in accordance with the system of the present invention, generally includes a box-shaped base 22 formed of lightweight, durable, opaque material, such as polystyrene. The bottom wall 24 of the base is substantially flat, except for a downwardly depending male coupler 26 that is located in the center of the bottom wall 24. The male coupler 26 is described more fully below.

The side walls 28 of the base 22 extend upwardly from the bottom wall 24 and support a cover 30. The pallet cover 30 includes a flat top 32 that has sides 34 extending downwardly from the edges of the top 32. The sides 34 of the top 32 fit over the upper ends of the base sidewalls 28. Preferably, an inwardly projecting lip 36 is formed in each side 34 of the cover 30 to rest upon the upper ends 38 of the base side walls 28.

The sides 34 of the cover 30 extend upwardly above the upper surface 44 of the pallet top 32 to define a peripheral ridge 46. The ridge 46 serves to direct any run-off (such as rain water) on the upper surface 44 toward drains 48 that are formed through the top 32 at each corner of the cover 30. Preferably, the upper surface 44 is slightly crowned for directing water to the corner drains 48. Each drain 48 is S-shaped and extends completely through the top 32 of the cover 30 to direct run-off into a root compartment 50 that is defined immediately beneath the top 32 and between the side walls 28 of the pallet base 22. The S-shape of the drains 48 prohibits light from entering the root compartment 50.

A plurality of spaced apart holes 52 are formed through the top 32 of the pallet cover 30. The holes 52 are configured to support plant containers 54 in a manner such that the containers 54 are disposed substantially within the root compartment 50 of the pallet 20.

A preferred plant container 54 generally comprises a perforated, thin, flexible plastic pouch. The container 54 is perforated with a multitude of pores that are sized to permit air and water flow therethrough, but to restrict root penetration through the pouch. Alternatively, a container may be formed of closely woven polypropylene strands. The container size is selected to best fit the shape of the root system of the particular contained plant and is deformable to allow for root growth. Preferably, the container 54 is filled with a suitable growing medium, such as a mixture of peat and vermiculite.

The open end 56 of each container 54 is connected to a holder 58 (FIGS. 3A–3E). One holder seats around the edge of each hole 52 formed in the top 32 of the pallet cover 30. More particularly, each hole 52 in the pallet top 32 is surrounded with an annular seat 51 having an L-shaped cross-section that defines a shoulder 53 that is recessed slightly beneath the upper surface 55 of the seat 51. The holder 58 has a cylindrical upper section 60 and an integrally formed, radially projecting bottom rim 62. The underside of the rim 62 is notched to engage the seat 51 so that the radially outermost portion of the rim 62 rests upon the shoulder 53 formed in seat 51.

The upper section 60 of the holder 58 extends upwardly, slightly above the upper surface 55 of the seat 51. The open end 56 of the container 54 passes through the center of the holder 58 and is wrapped over the upper section 60 to be secured thereto by a removable elastic band 64 that is stretched around the outer wall of the upper section 60.

As best shown in FIG. 3B, the interior diameter of the holder 58 is less than that of the hole 52. Accordingly, a holder 58 and attached plant container can be removed from a pallet 20 by lifting the holder 58 upwardly.

Preferably, the holder 58 is formed of two hinged components that can pivot a single hinge 66 so that the holder 58 may be opened from its annular configuration for removing the plant and container 54 from the holder 58 without having to move the container 54 or plant foliage 72 through a closed annulus. It is noteworthy that because the holder 58 is not part of the container 54, the holder may be reused numerous times. Moreover, a single holder may be used with a number of different container sizes.

As best shown in FIG. 2, the containers 54 are secured by holders 58 so that the plant trunk 70 and foliage 72 extends above the upper surface 44 of the pallet 20, and the contained roots 76 are held in the root compartment 50. As one aspect of the present invention, the plant roots 76 and trunk 70 are protected from the deleterious effects of extreme changes in ambient air temperature. To this end, the top 32 and sides 34 of the pallet cover 30 have a durable, water impermeable, light reflecting outer layer, such as polystyrene, lined with insulating material, such as closed-cell styrofoam. The preferred thickness of the insulating material is in the range of approximately 1 cm to 10 cm.

Figure 4A:
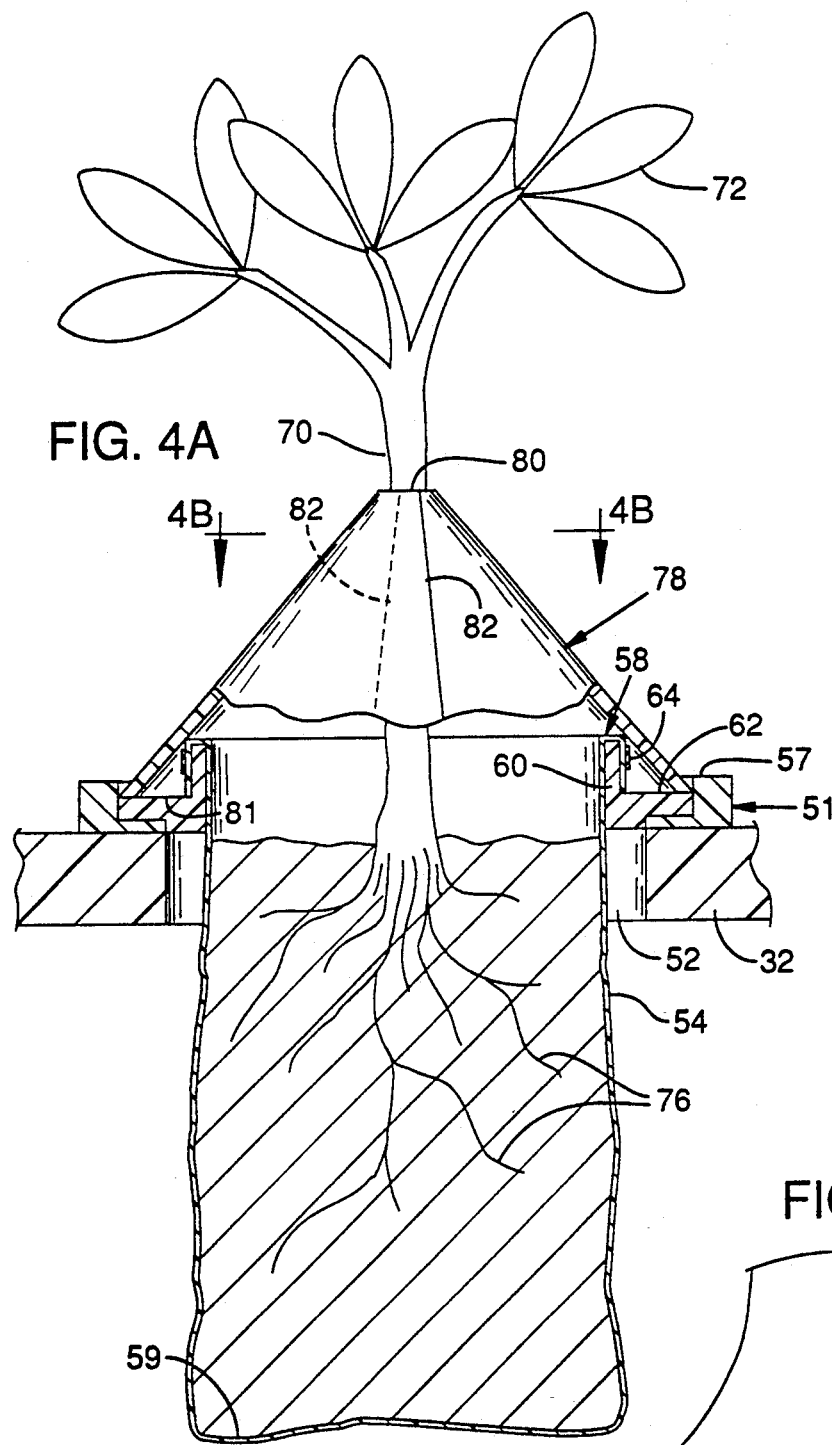
FIGS. 4A and 4B illustrate a collar used in conjunction with the present system for covering the upper end of a plant container.
Figure 4B:
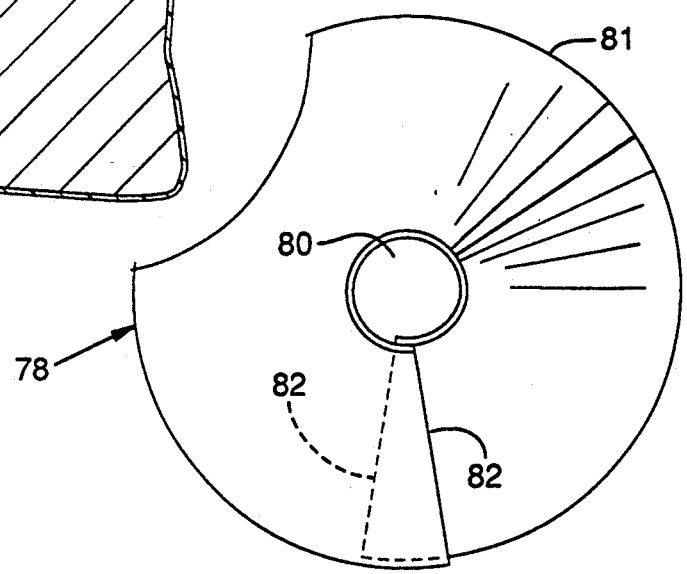

The roots 76 near the open end 56 of the container 54 and the base of the plant trunk 70 are insulated by a collar 78 (FIGS. 4A-4B) that rests upon the holder 58. The collar 78 surrounds the trunk 70 and substantially covers the open end 56 of the container 54. The collar 78 is a flexible plastic member having a generally circular shape in plan view (FIG. 4B) and presenting a truncated cone shape in side elevation view (FIG. 4A). The top aperture 80 in the collar 78 surrounds the trunk 70 of the plant. The bottom rim 81 of the collar rests upon the rim 62 on the holder and abuts the upwardly projecting part 57 of the seat 51.

Collar 78 is formed of light-impermeable plastic that is lined on its inner (i.e., plant-facing) surface with suitable insulating material, such as styrofoam. Preferably, the collar 78 is formed as a single piece with overlapping, unattached ends 82. This construction of the collar 78 permits the ends 82 to be moved apart or together to adjust the size of the collar base 81 and aperture 80 to correspond to the size of the container hole 52 and plant trunk 70, respectively.

It is noteworthy that, in addition to its insulating properties, the collar 78 prohibits light from reaching the growing medium near the open end 56 of the container 54. Accordingly, weed growth within the container 54 is inhibited. Moreover, the collar 78 provides a shield to protect the plant roots 76 from invasive insects. It is also noteworthy that the collar 78 is shaped to support the plant trunk 70 so that the plant is less likely to be damaged by wind.

The collar 78 prevents loss of evaporation moisture from the container so that salt accumulation at the surface of the growing medium or at the plant stem is prevented. It is also noteworthy that the collar prevents aerial-applied water, such as rain, from contacting the top surface of the growing medium, thereby preventing downward leaching that would disturb the stable gradients (equilibria) in the root zone.

Water flowing off the surface of the collar 78 to the pallet top surface 44 is removed from the pallet surface by the corner drains 48 mentioned earlier.

A water reservoir 88 is defined in the base 22 of the pallet 20. The reservoir 88 provides a water source for capillary irrigation of the plants. Moreover, the water reservoir 88 serves an important insulating function by damping or minimizing the transfer of heat into and out of the root compartment 50.

The reservoir 88 is defined between the side walls 28 of the pallet base 22 and covers the bottom wall 24. Water is supplied to the reservoir from a water supply/drain pipe 90 that extends beneath the pallet 20. In one embodiment (FIG. 2), the pallet 20 is placed with the bottom wall 24 adjacent to the ground surface 94. The supply/drain pipe 90 is carried in a trench 91 formed to extend beneath the center of the pallet. In another embodiment (FIG. 10A), the pallet 20 (hence, the reservoir 88) is supported above the supply/drain pipe 90 by the wedge-shaped legs 92 that are attached to the underside of the pallet bottom wall 24 at each corner of the pallet base 22.

Figure 5C:
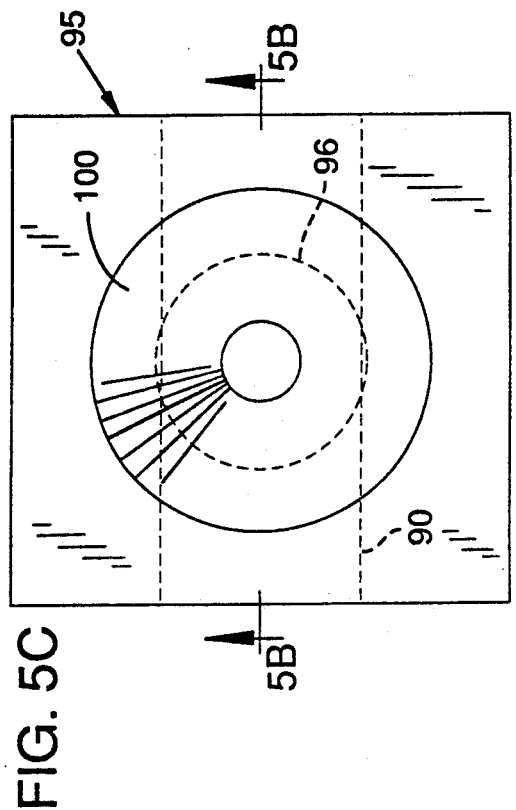
FIGS. 5A–5C illustrate a fitting for connecting a pallet to an underlaid water supply/drain pipe.
Figure 5B:
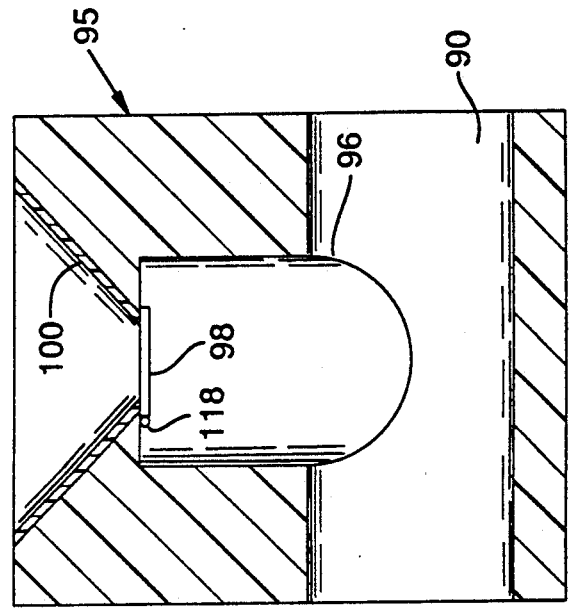
Figure 5A:
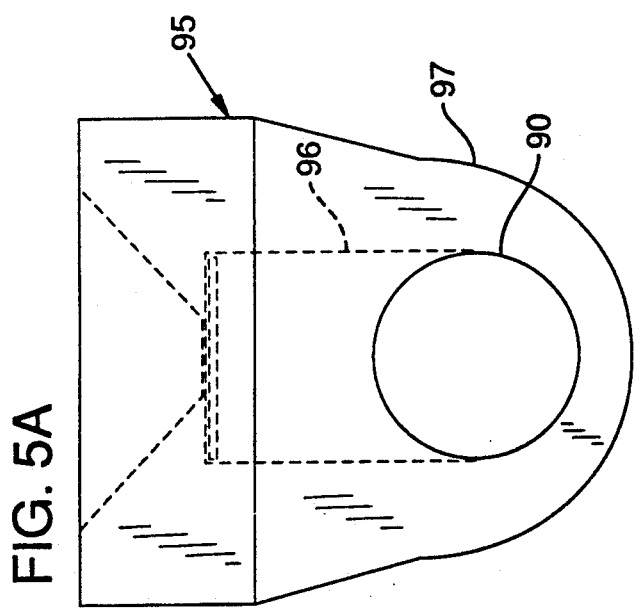

A riser pipe 96 is connected to the supply/drain pipe 90 beneath the center of each pallet 20. As best shown in FIGS. 5A–5C, the otherwise closed upper end of the riser pipe 96 includes a flap valve 98 that is normally biased closed. The junction of the riser pipe 96 and supply/drain pipe 90 is encased within a rigid fitting 95 formed, for example, of polyvinylchloride (PVC). The lower outer surface 97 of the fitting 95 is shaped to conform to the cross-sectional shape of a trench 91 into which the supply/drain pipe 90 is laid.

A portion of the upper surface of the fitting 95 is configured to define an inverted truncated cone, that surface portion of the fitting 95 will be hereafter referred to as the female coupler 100. The smaller diameter end 102 of the female coupler 100 surrounds the flap valve 98 in the upper end of the riser pipe 96. Preferably, the surface of the female coupler 100 is lined with a deformable sealing material, such as silicone rubber.

Figure 6:
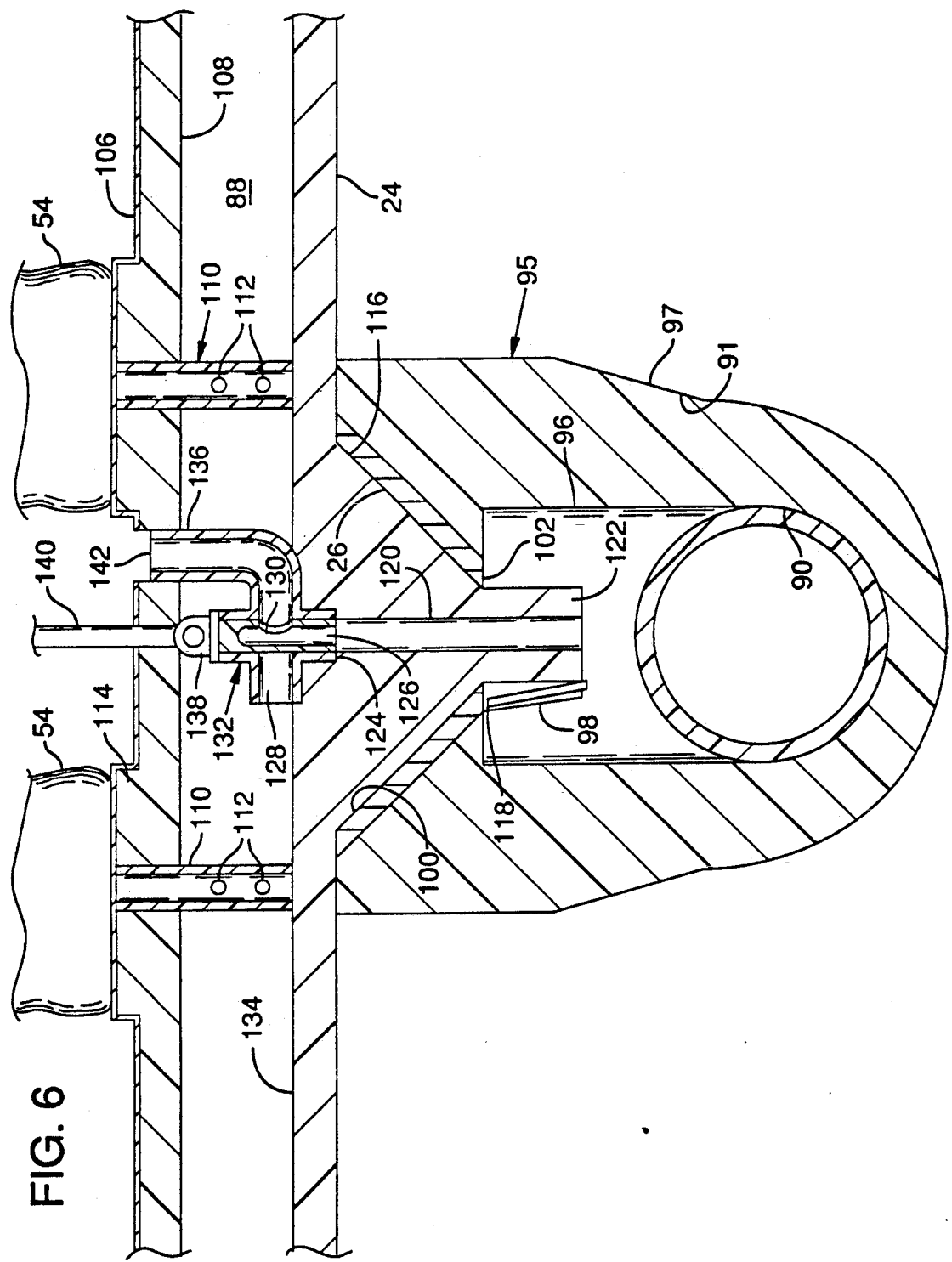
FIG. 6 is a cross-sectional view of the mechanism for controlling the flow of water into and out of the capillary irrigation system that is incorporated into each pallet.

With reference to FIG. 6, the male coupler 26 in the bottom wall 94 of the pallet 20 is also shaped as an inverted, truncated cone having a cylindrical extension 122 protruding from the smaller diameter part 118 of the cone. The larger diameter end 116 of the male coupler 26 is integrally formed with the pallet bottom wall 24. A vertically oriented conduit 120 extends through the bottom wall 24 of the pallet and through the center of the male coupler 26.

The male coupler 26, female coupler 100, and associated components (riser plate 96, flap valve 98, extension 122, etc.) are configured and arranged so that as a pallet 20 is lowered over the riser pipe 96, the extension 122 of the male coupler 26 will force open the flap valve 98, hence providing fluid communication between the supply/drain pipe 90 and the conduit 120. As the pallet 20 is further lowered, the male coupler 26 will securely nest with the female coupler 100, thereby sealing the fluid connection between the pallet 20 and the supply/drain pipe 90.

It can be appreciated that whenever a pallet 20 is lifted away from the supply/drain pipe 90, the extension 122 of the coupler 26 will move out of the riser pipe 96, thereby allowing the flap valve 98 to close. Accordingly, the supply/drain pipe 90 will not leak in the absence of a connected pallet.

As noted earlier, the water reservoir 88 provides a water source for capillary-type root irrigation of the plant containers 54. To this end, the root compartment 50 of the pallet includes a capillary mat 106 supported between the top 32 and bottom wall 24 of the pallet 20. More particularly, a support platform 108 of rigid plastic, such as 0.5 cm thick polystyrene, is held above the reservoir bottom wall 24 by cylindrical support tubes 110 that extend downwardly from the underside of the support platform 108 to rest upon the pallet bottom wall 24. The support tubes 110 are positioned so that one support tube is beneath each hole 52 in the pallet top 32. Preferably, the support tubes 110 are formed with openings 112 extending through the tube walls for conducting upward movement of water through the support tubes 110, as described more fully below.

The capillary mat 106 is approximately 0.5 cm thick and formed of any suitable high-capillarity material, such as non-woven polyester fibers. One suitable capillary mat is that manufactured by Pellon Corporation under the trademark WATER MAT. The mat 106 is placed over the top of the support platform 108. The support platform 108 has a raised portion 114 underlying each hole 52 in the pallet top 32. Preferably, the plant containers 54 and the support tubes 110 are sized so that the bottom 59 of the container 54 will rest upon the portion of the capillary mat 106 that covers the raised portion 114 of the support platform 108.

It can be appreciated that the distance between the lip 36 in the pallet cover 30 and the top surface 44 of the cover may be varied so that the height of the root compartment 50 will correspond to the height of the plant container 54.

The support tubes 110 are filled with a high-capillarity wicking material, such as a porous polyurethane material. Consequently, water in the reservoir 88 passes through the openings 112 in the support tubes 110 and is wicked by the wicking material with the tube 110 to the capillary mat 106, where it is drawn by the capillarity of the growth medium in the porous container 54 to supply the roots 76.

Turning now to the particulars of the mechanisms for filling and draining the water reservoir 88 and with particular reference to FIGS. 6 and 7A–E, water passing through the riser pipe 96 passes upwardly through the conduit 120 in the male coupler 26. The upper end 124 of the conduit 120 joins one 126 of three orifices 126, 128, and 130 formed in a valve fitting 132. The valve fitting 132 is seated in the bottom wall 24 of the pallet base and includes a drain orifice 128. The drain orifice 128 has a substantially horizontal central axis, and the invert of the drain orifice 128 is established at substantially the same elevation as the bottom surface 134 of the pallet bottom wall 24.

The third orifice, the stand pipe orifice 130, is formed in the valve fitting 132 to extend therefrom in a direction substantially opposite that of the drain orifice 128. A stand pipe 136, which mates with the orifice 130 via a 90° elbow part, extends upwardly from the valve fitting 132. Preferably, the upper end 142 of the stand pipe 136 terminates within a recess formed in the capillary mat support platform 108.

A valve 138 is incorporated into the valve fitting 132 and is controllable for closing the drain orifice 128, while simultaneously opening the fluid communication between the conduit 120 and the stand pipe 136. The valve 138 is also operable for closing the stand pipe 136 while simultaneously opening the fluid communication between the drain orifice 128 and the conduit 120.

After the pallet 20 is positioned so that the male coupler 26 and female coupler 100 are mated, the pallet reservoir 88 is ready for filling. Accordingly, the source/drain pipe 90 is connected to a main reservoir (not shown) that contains water (or other suitable solution) for delivery to the pallet reservoir 88. The valve 138 is rotated (for example, by an elongated handle 140 that is attached to the valve 138 to extend upwardly through the pallet above the cover 30) so that the drain orifice 128 is closed. Water then flows from the source/drain pipe 90, through the riser pipe 96 and connected conduit 120 in the male coupler 26, then up through the stand pipe 136 to fill the root compartment 50 of the pallet 20.

The entire root compartment 50 of the pallet 20 is initially filled with water in order to saturate the interior of the plant containers 54 and the capillary mat 106 to thereby establish capillarity. After a time sufficient to allow the pallet 20 to be filled with water, the inflow of water through pipe 90 is discontinued. The supply/drain pipe 90 is then used for removing excess water from the pallets. To this end, the supply/drain pipe 90 is emptied of water (for example, by gravity flow to the main reservoir) so that any water in the root compartment 50 that is above the upper end 142 of the stand pipe 136 will flow through the stand pipe and conduit 120 in the male coupler and out the supply/drain pipe 90, as described more fully below.

The upper end 142 of the stand pipe 136 establishes the water level within the reservoir 88. In this regard, it is noteworthy, as shown in FIG. 6, that the upper level of the water reservoir will be beneath the bottoms 59 of the containers 54, which bottoms rest on the raised portions 114 of the capillary mat support platform 108. Accordingly, the bottoms 59 of the containers are not submerged within the water in reservoir 88. The maximum upper level of the reservoir (i.e., the elevation of the upper end 142 of the stand pipe) is somewhat beneath the bottoms 59 of the containers 54 (i.e., beneath the elevation of the raised portions 114 of the support platform 108). Accordingly, if the pallet 20 is positioned so that it is not precisely level, water in the lower end of the reservoir 88 should remain below the container bottoms 59 located in the low end of the pallet.

As noted earlier, water in a reservoir 88 enters the support tubes 100 through the openings 112 formed in the tubes 110. The water is then wicked upwardly to the capillary mat 106 from where it is drawn into the containers 54 by the capillarity of the growth medium. It can be appreciated that the reservoir can be sized to provide a substantial amount of water, thereby permitting the plants to be unattended (with respect to irrigation) for significant amounts of time.

As mentioned earlier, the water in the reservoir 88 serves an important function of insulating the bottom of the pallet 20. In this regard, the volume of water within the reservoir serves as a heat source or heat sink in order to buffer changes in the air temperature surrounding the pallets. As is known in the art, container-grown plants that are not subjected to extreme temperature changes will be generally healthier and larger than plants that were subjected to such changes.

In the event that the ambient air temperature becomes extremely cold, a small volume of water may be periodically flowed into the pallet through the stand pipe 136 to prevent freezing of the plant roots.

In order to drain the reservoir 88 in the pallet 20, the valve 138 is rotated so that the drain orifice 128 is placed in fluid communication with the conduit 120 in the male coupler 126. Any water within the reservoir 88 then flows through the orifice 128, conduit 120, and supply/drain pipe 90, and back to the main reservoir. When the pallet is completely emptied, the reservoir is refilled with warmer water in the same manner as described earlier.

It can be appreciated that the mechanism for draining the reservoir 88 will be useful in the event that the pallet is to be moved. More particularly, whether the pallet is moved by hand or by lifting mechanisms (described hereafter) the pallet will be considerably lighter when the water reservoir is drained. Accordingly, the valve 138 may be rotated to open the drain orifice 128 (hence, draining the reservoir) before a pallet is moved.

As another aspect of this invention, there is provided a mechanism for precisely locating a plurality of pallets. Edge-to-edge placement of pallets excludes light from underlying surfaces, thereby preventing weed growth. Edge-to-edge placement also collects and diverts all rainfall through S-drains on pallet tops, thus negating the need for a drainage system for underlying surfaces.

Figure 9A:
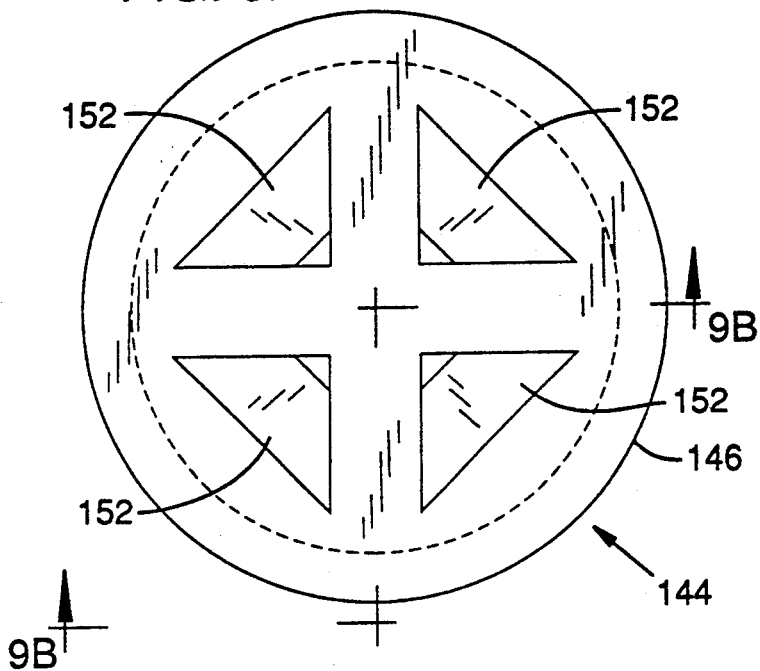
FIGS. 9A and 9B illustrate receptors for securing the feet of pallets that are placed on the ground.
Figure 9B:
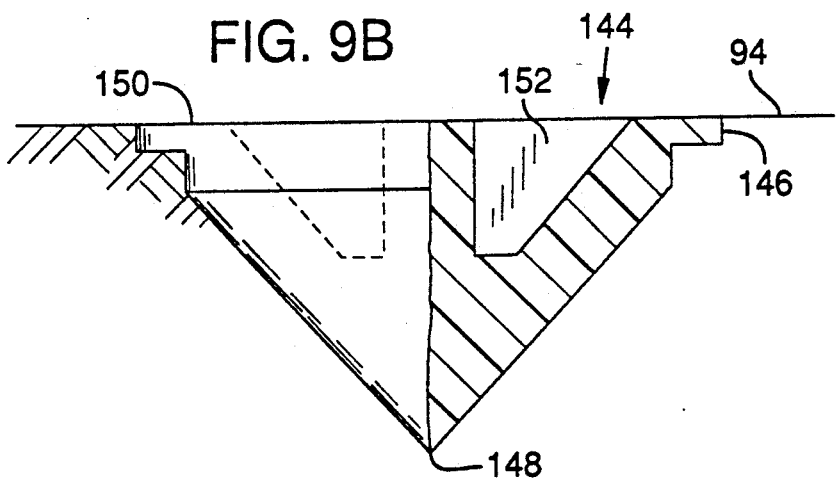

Edge-to-edge placement also prevents connective, conductive and radiant heat loss to the air from underlying surfaces, i.e, earth, and from the sides and bottoms of the pallets. Edge-to-edge placement maximizes space utilization and allows for a plurality of pallets to be served by a single supply/drain pipe. To this end, anchor members 144 (See FIGS. 8 and 9A–9B) are sunk to just below ground level and are configured to receive the downwardly projecting legs 92 of the pallets 20. Moreover, the anchor members 144 are precisely spaced so that when the four pallet legs 92 are lowered into an associated set of four anchor members 144, the male coupler 26 on the pallet 20 will be properly aligned with the female coupler 100 formed on the fitting 95.

The anchor members 144 are generally shaped as an inverted cone having a flanged base 146 and a lower point 148. The anchor members 144 are positioned so that the upper surface 150 of the cone base 146 is substantially co-planar with the floor 94 or other surface onto which the pallets 20 are placed. Each anchor member 144 includes four recesses 152 extending into the base 146 of the anchor member. Each recess 152 is shaped to conform to the shape of the pallet leg 92 so that the bottom wall 94 of the pallet rests upon the flanged base 146 of the anchor member.

As best shown in FIG. 8, the recesses 152 in the anchor members are arranged so that pallets can be placed in close proximity with one another. The close spacing of the pallets is advantageous, not only for minimizing the space required for an integrated system of pallets, but also for minimizing the air space between pallets so that any heat transfer between pallets is minimized.

Figure 10B:
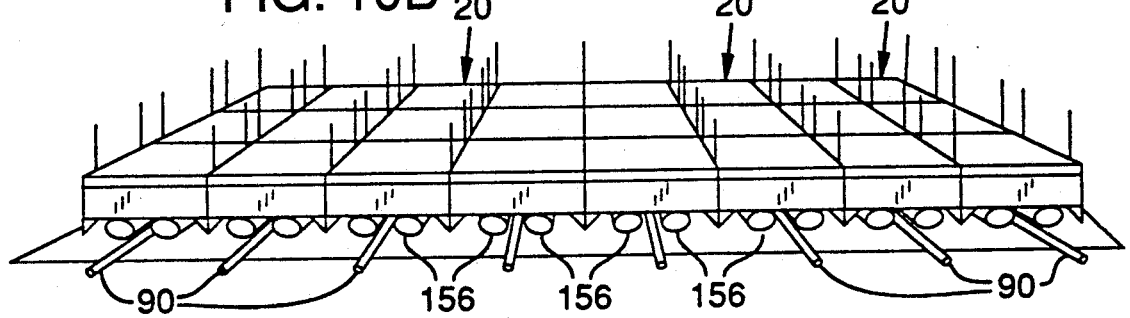
FIG. 10B is a pictorial view of an integrated plurality of pallets.

FIGS. 10A and 10B depict a pallet 20, formed in accordance with the present invention, with the legs 92 carried in anchor members 145 that rest upon the floor 94. The anchor members 145 are similar to the above-described anchor members 144, except that anchor members 145 have a flat bottom 147 and have no flange extending from the top 149. Placing the pallets in this fashion (i.e., with a bottom wall 24 raised above the floor 94) is useful in instances where it is desirable to provide auxiliary elements for heating the pallets 20. To this end, elongated, flexible plastic, water-filled tubes 156 may be placed along either side of the supply/drain pipe 90 to extend beneath an entire row of adjacent pallets. The temperature of the water in the tubes 156, and consequent conductive control of the pallet root compartment temperature may be controlled to provide optimal growing conditions for the plants.

With reference to FIGS. 1 and 10B, the preferred embodiment of the present system includes rigid attachment straps 162 fastened to extend upwardly from the pallets 20. The upper ends of the straps 162 are, therefore, exposed for engagement by any suitable overhead system for removing or replacing pallets 20 within the integrated plurality of pallets. In this regard, as shown in FIGS. 11A-11D, one suitable mechanism for moving the pallets 20 includes manipulator system 400 for transporting and lowering pallets 20 into place in the production area, and for lifting and removing individual pallets from the production area. The system 400 includes, a gantry 402 and motion control unit 404.

The gantry 402 extends across a production area and moves to position the motion control unit 404 over any pallet 20 in the production area. Movement of the gantry 402 and mechanism for lifting pallets is controlled by the motion control unit 404. Preferably, the mechanism for lifting pallets comprises four rack gears which are driven by hydraulic powered pinion gears. The four lift points are located at the corners of the motion control unit 404 allowing for ease of alignment with the lift straps 162 of the pallet 20 or of the foliar application unit 107. The end of each rack gear is fitted with a hydraulic gripping mechanism.

The motion control unit 404 straddles the gantry support frame 406 to reduce the distance between the gantry and the plants. Gantry-to-plant distance directly affects placement cycle time.

The gantry 402 is supported by and moves on light rails 410. Positioning of the floor-placed rails 410 and the width of the gantry bridge are tailored for retrofit into existing greenhouses or nursery beds so that the bridge will not encounter any vertical greenhouse structural members or overrun existing nursery beds in its movement.

Figure 11A:
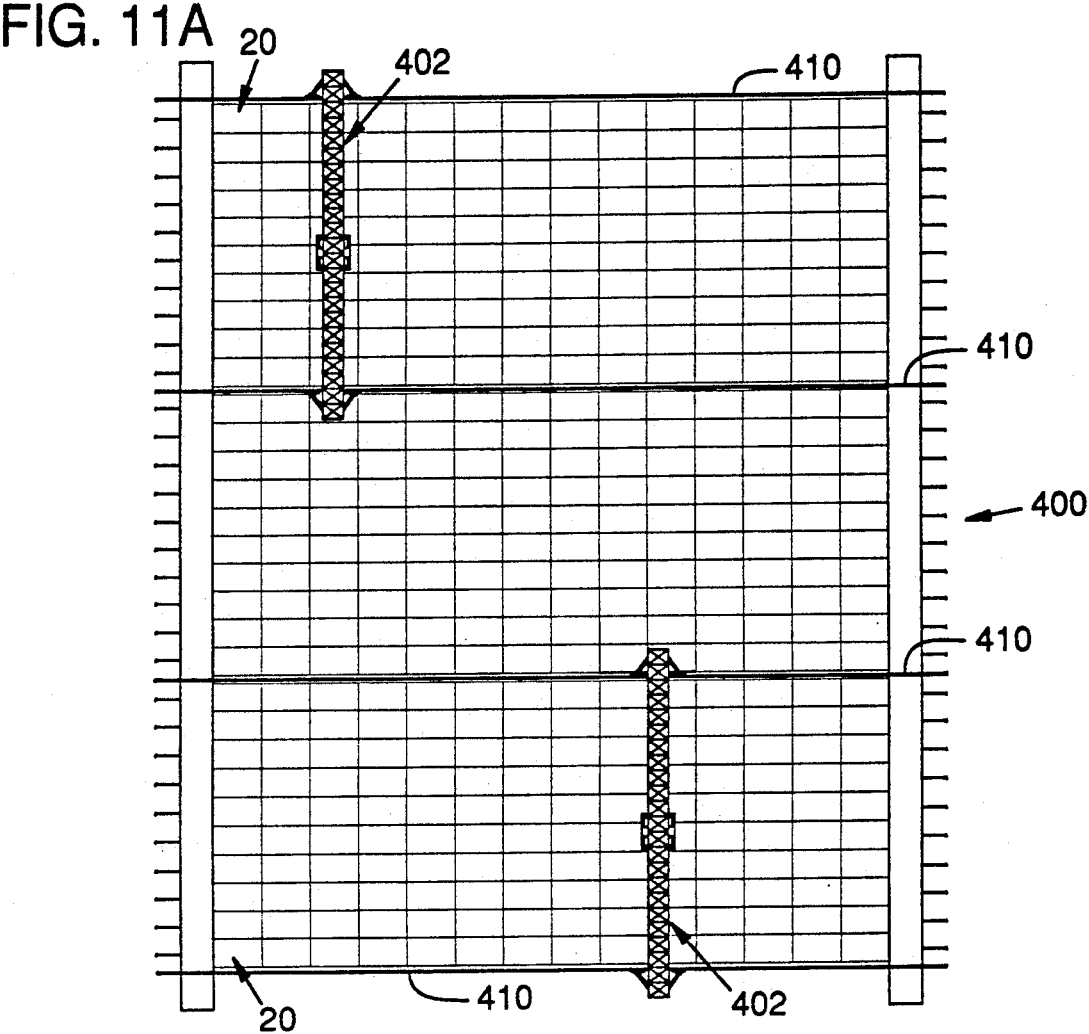
FIGS. 11A–11D are diagrams of a manipulator system for moving pallets.
Figure 11B:
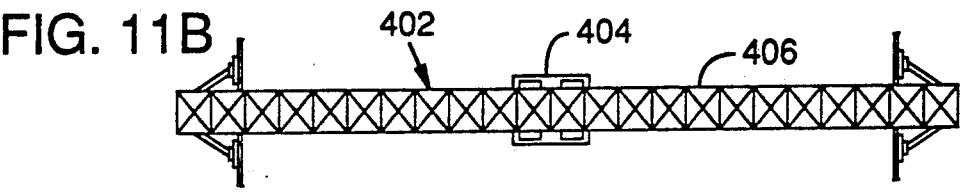
Figure 11C:
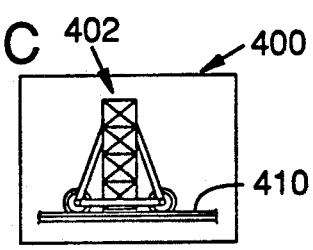
Figure 11D:
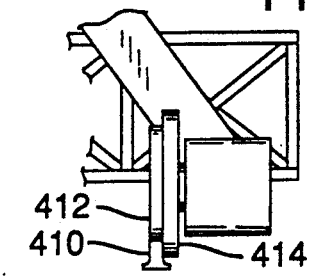

The gantry 402 is mounted on a rail system 410 using a railroad type steel wheel 412 (FIG. 11D). The wheel 412 should have a raised inner guide ring with a bonded elastomer press-on wheel ring 414. The gantry is supported by light rail for movement over the production area because light rail has a smaller foot print than would an inflated-tire, load-bearing surface. The light-rail gantry system also allows for more precise control of movement.

The gantry unit can be moved from production area to production area on a main service road, such as a greenhouse center aisle. This is accomplished by moving gantry unit on rails to center aisle (greenhouse) or center roadway (field nursery). Two separate hydraulic lift carriages, similar to a pallet-jack, will be placed under either end respectively of the gantry to elevate the rail wheels and facilitate movement of the gantry down the aisle/roadway for mechanical or manual repositioning in another production area.

Figure 12:
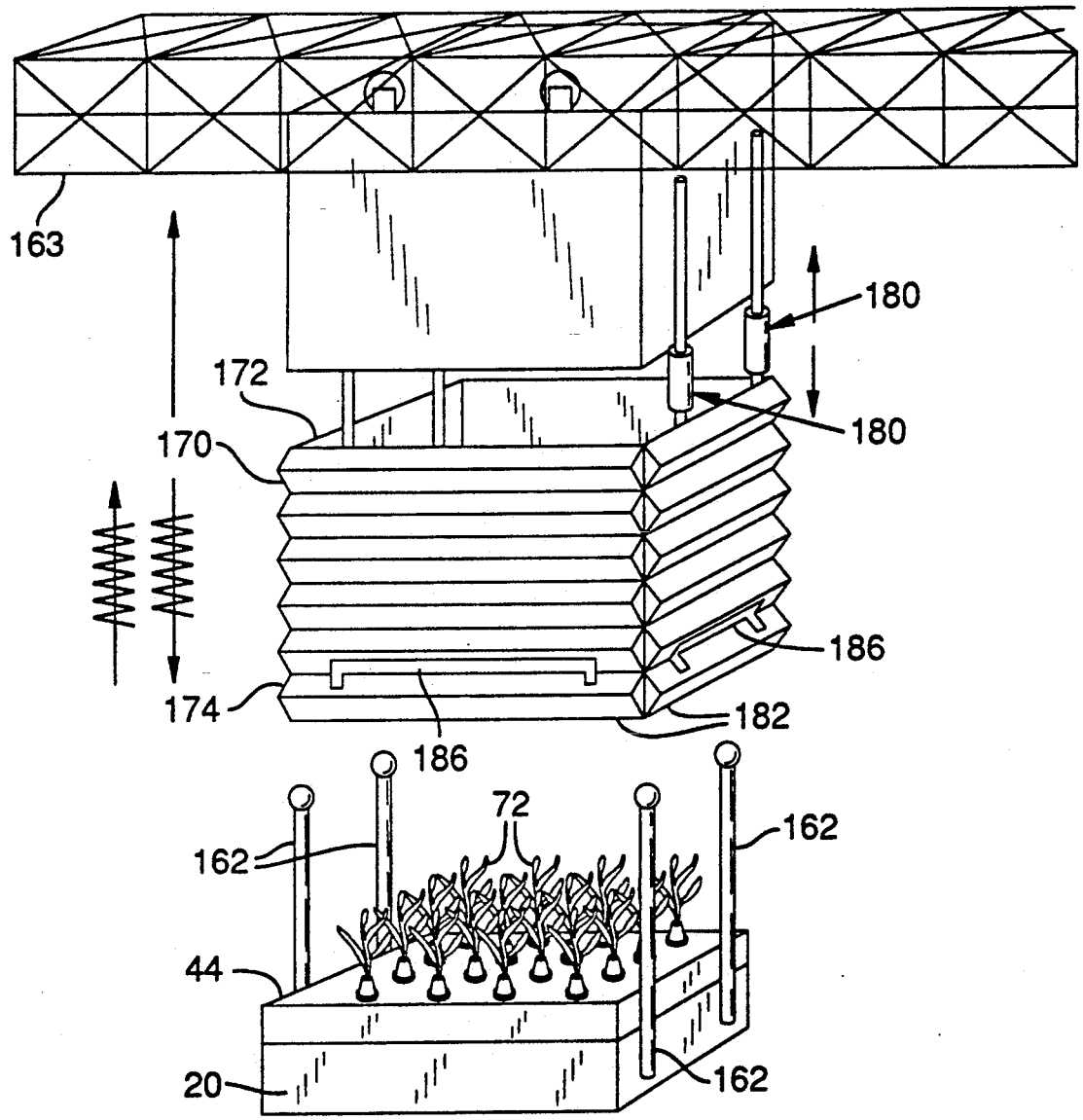
FIG. 12 is a pictorial view of a mechanism for applying foliar pesticides or growth regulators to the plants.

The system of the present invention also includes a mechanism for applying solutions to the foliage of plants secured by the pallets. As shown in FIG. 12, the overhead gantry 163 is modified to carry a motorized trolley 168 and foliar application unit 170. The trolley 168 may be positioned immediately above any particular one of the integrated plurality of pallets (FIG. 10B).

The unit 170 comprises a top 172 and four sides 174 that depend downwardly from the edges of the top 172. The top 172 is secured to the trolley 168 by telescopically movable arms 180. The arms 180 are extended (for example, by suitable hydraulic drive mechanisms) to lower the unit 170 over one or more pallets 20. The bottom edges 182 of the unit sides 174 rest upon the top surface 44 of the pallet so that the foliage 72 of all of the plants in the pallet 20 is enclosed within the internal chamber 184 that is defined beneath the top 172 and between the sides 174 of the unit 170. Preferably, the sides 174 of the unit 170 are formed in a corrugated or bellows-type configuration so that the height of the unit 170 may be adjusted to correspond to the height of the particular plants in the pallet 20. The bellows construction enables the unit to be contracted upward to provide clearance over plants as the unit is repositioned.

Conventional fog or mist applicators (not shown) are mounted to the unit 170 within the internal chamber 184 near the bottom of that chamber. A conventional suction fan is carried beneath the top 172 of the unit for drawing the mist solution (pesticides, liquid fertilizers, growth regulators, etc.) through the foliage 72 toward the top of the unit 170. A discrete condenser/collector chamber is incorporated within the unit internal chamber 184 near the suction fan for the purpose of collecting excess mist. Condensed excess mist is recycled to the fog applicators.

Plant debris and insects that are drawn upwardly through the chamber 184 by the suction fan are separated from the air stream by a screen. Preferably, the fans incorporated in the fog applicators and used as a suction fan are of the type known in the trade as backward inclined radial vein blowers. Such blowers have the greatest efficiencies over the broadest range of revolution speed.

After the mist is applied, adjustable air inlets 186 formed in the unit sides 174 are opened, and air is drawn into the chamber 184 by the suction fan to air-dry the foliage 72. Air discharged from the unit 170 is channelled through a chemical filter.

Figure 13:
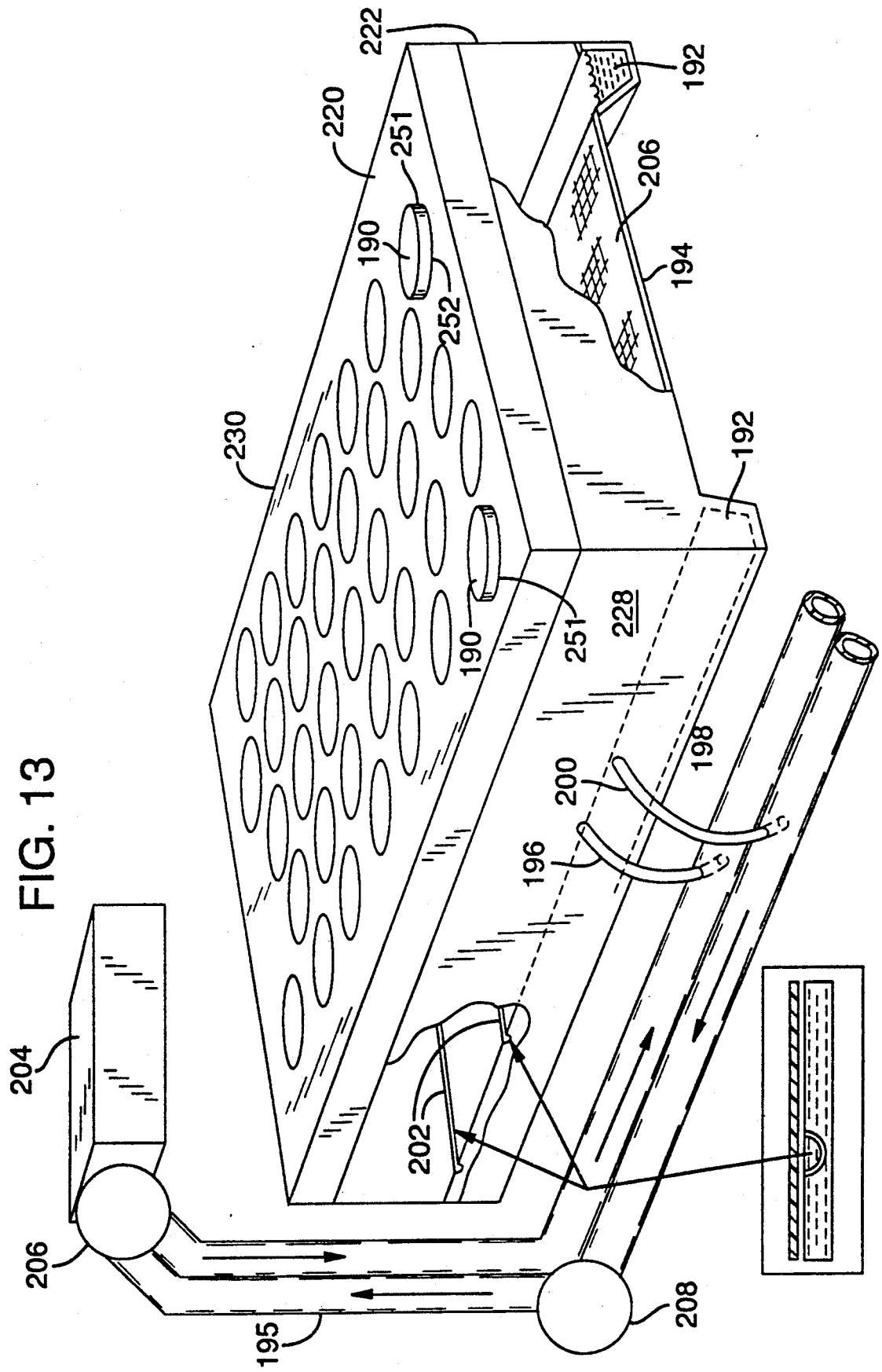

FIG. 13 depicts a pallet 220 that is adapted for use in retail stores or the like. The pallet cover 230 is substantially the same as the cover 30 described with respect to the embodiment of FIG. 2. For illustrative purposes, the cover 230 of the modified pallet 220 is shown in FIG. 13 with all of the contained plants removed. A flexible cap 190 is fit over the seat 251 that surrounds the opening 252 in the top 230. The caps 190 serve to prevent foreign matter from entering the holes 252 when plants are not placed in the holes. It can be appreciated that caps 190 may be employed with the embodiment described with respect to FIG. 2. When so employed, the cap 190 may be lined with insulating material to help maintain the appropriate root compartment temperature.

The base 222 of the modified pallet 220 is formed to include two elongated reservoir channels 192 that extend along opposing sides of the pallet 220. The channels 192 extend downwardly from a flat central portion 194 of the bottom wall 224 of the pallet. The channels 192 are filled with water.

A capillary mat 206, such as the mat 106 described in connection with the embodiment of FIG. 2, is placed over the central portion 194 of the bottom wall 224. The opposing ends of the capillary mat 206 extend downwardly into the reservoir channels 192. Accordingly, water is drawn from the channels 192 and across the capillary mat 206.

The bottoms of the containers that are stored in the modified pallet 220 rest on the capillary mat 206. Water is drawn to the plant roots via the capillarity of the contained growth medium in the containers.

A continuous loop irrigation line 195 comprising polyethylene pipe supplies irrigation water to each pallet 220 through an inlet capillary tube 196. An overflow tube 198 returns water to the irrigation loop 195. To this end, the overflow outlet 200 from the pallet 220 is located on the side wall 228 of the pallet at the same elevation as the upper surface of the central portion 194 of the bottom wall 224. Accordingly, the elevation of the water in the reservoir channels 192 remains at or beneath the level of the capillary mat 206.

Secondary water channels 202 are formed in the central portion 194 at closely spaced intervals to extend between the reservoir channels 192. The secondary channels 202 facilitate movement of water across the central portion 194 to ensure water is supplied to the entire capillary mat 206.

A make-up water reservoir 204 supplies the irrigation line 195. A pump 206 is interconnected between the reservoir 204 and the irrigation line 195 for pumping water through the irrigation line 195. Preferably, the pump is actuated by a float valve within the reservoir 204 so that the water level in the pallet reservoir channels 192 in constantly maintained.

Preferably, an injector 208 for applying chlorine or bromine to the water is connected to the irrigation line 195.

Figure 14A:
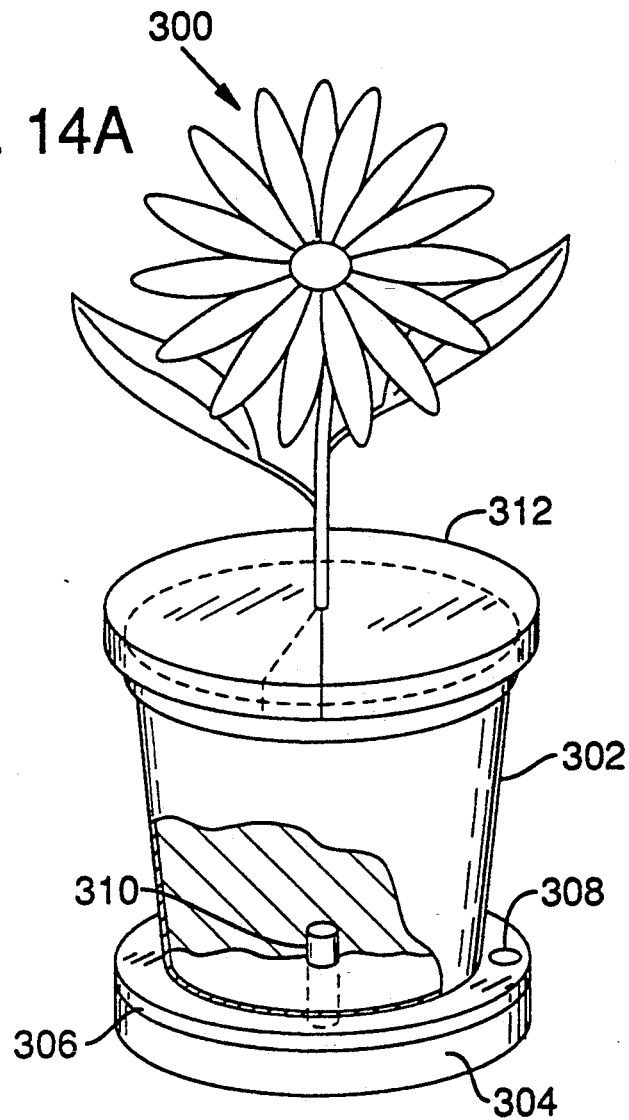
FIG. 14A and 14B are diagrams of an individual plant containing system formed in accordance with the present invention.
Figure 14B:
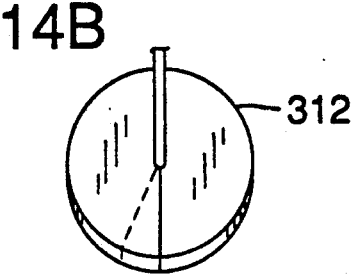

With reference to FIGS. 14A and 14B, the present invention provides an individual container system to which a pallet-grown plant may be transferred.

After the plant is grown in the pallet system, the plant 300, e.g., poinsettia, may be transferred to an individual plant container 302 for display and maintenance. To ensure continued health of the plant 300, a single plant container system providing root zone conditions similar to those provided by the pallet is required.

The plant 300, with root medium contained in the film plastic bag, may be transferred to decorative, commercially available container 302 of appropriate size.

The container 300 is placed on an enclosed water reservoir 304. The closed water reservoir 304 is filled through a snap-on cap 306 having an air inlet 308. Water is drawn (as by wick 310) by capillarity from the reservoir 304 through openings in the container bottom to continuously sub-irrigate the contained plant.

A self-adjusting, snap-on container lid/plant collar 312 serve the same functions as the plant collar 78 of the embodiment described with respect to FIG. 2, i.e., maintain a stable root environment by preventive heat, light, and moisture transfer between the aerial environment and the top surface of the plant root zone.

Although the principles of the invention have been described and illustrated with reference to preferred embodiments, it should be apparent to one of ordinary skill in the art that the invention can be further modified in arrangement and detail without departing from such principles.

We claim:

1. A pallet for supporting a plurality of plants, each plant having roots contained within a container so that the plant shoots may extend above the container, comprising:

a base having a bottom and sides;

a top attached to the base, the top and base defining a compartment;

container support means for supporting the containers within the compartment with the containers beneath the top, the top having a plurality of holes formed therein for permitting plant shoots to extend above the top; and insulating means for thermally insulating the top and sides of the base, the base constructed to define a reservoir for liquid stored within the compartment beneath the containers, the insulating means including a plurality of covers arranged for establishing a thermally insulating barrier between the containers and plant shoots extending therefrom, wherein each cover comprises a moisture impermeable, reflective, opaque, thermal-insulating member having an opening formed therethrough, the size of the opening being changeable so that plant shoot portions of various sizes may be surrounded by the flexible member, to prevent aerial-applied water from reaching the top of the containers.

2. The pallet of claim 1 wherein the insulating means also includes a layer of thermally insulating material attached to the top and the sides of the base.

3. The pallet of claim 1 further comprising irrigation means including a capillary mat carried by the container support means in contact with, and outside the container, the capillary mat being configured for transferring liquid to the containers, the irrigation means also including wicking means extending between the reservoir and the capillary mat for delivering liquid from the reservoir to the capillary mat.

4. The pallet of claim 3 further including level control means for establishing the level of liquid in the reservoir to be beneath the capillary mat.

5. The pallet of claim 1 further comprising level control means including a valve assembly connected to the base and operable for filling and emptying the reservoir.

6. The pallet of claim 1 further comprising coupling means for connecting the reservoir with a fluid-carrying conduit, the coupling means configured for opening fluid communication between the reservoir and conduit whenever the base is positioned adjacent to the conduit and for closing fluid communication between the reservoir and conduit whenever the base is moved from the position adjacent the conduit, the coupling means including a valve and stand pipe connected thereto and operable for establishing within the compartment a selected liquid level.

7. The pallet of claim 1 wherein the member is shaped as a truncated cone adjustable for defining the opening to be substantially circular irrespective of the size of the opening for supporting a plant shoot in an upright position.

8. The pallet of claim 2 wherein the bottom of the base is configured for placement in contact with an underlying surface for conducting heat between the reservoir and the surface.

9. A pallet for supporting a plurality of plants, each plant having roots contained within a container so that the plant shoots may extend above the container, comprising:
   a base having a bottom and sides;
   a top attached to the base, the top and base defining a compartment;
   container support means for supporting the containers within the compartment with the containers beneath the top, the top having a plurality of holes formed therein for permitting plant shoots to extend above the top, wherein the container support means includes an annular holder attachable to the plant container, the holder being hinged to open to permit movement of a contained plant out of the holder; and
   insulating means for thermally insulating the top and sides of the base, the base constructed to define a reservoir for liquid stored within the compartment beneath the containers.

10. A pallet system for growing plants comprising:
    a pallet member configured for supporting a plurality of plants that have individually contained root systems, the pallet member having a top, bottom, sides, and legs for supporting the pallet member bottom above a surface, the pallet member defining a compartment for substantially enclosing the contained roots of the plants, the compartment having liquid stored therein beneath the contained plants; and
    heating means disposed beneath the pallet member bottom for heating the pallet member compartment, the heating means including a container disposed between the surface and the pallet member bottom, the container carrying fluid for heating the compartment defined by the pallet member.

11. The system of claim 10 wherein the fluid container comprises a flexible bag.

12. The system of claim 10 wherein the fluid container contains water.

13. The system of claim 10 wherein the heating means includes a pair of flexible, water-filled tubes.

14. A pallet for supporting a plurality of plants, each plant having roots contained within a container so that the plant shoots may extend above the container, comprising:
    a base having a bottom and sides;
    a top attached to the base, the top and base defining a compartment;
    container support means for supporting the containers within the compartment with the containers beneath the top, the top having a plurality of holes formed therein for permitting plant shoots to extend above the top; and
    insulating means for thermally insulating the top and sides of the base, the insulating means also including a fluid-carrying member disposed beneath the base, the base constructed to define a reservoir for liquid stored within the compartment beneath the containers.

15. The pallet of claim 14 wherein the fluid-carrying member comprises a flexible water-filled bag, the temperature of the water in the bag being controllable for heating the compartment to a selected temperature.

16. The pallet of claim 15 wherein the fluid-carrying member comprises a flexible water-filled bag, the temperature of the water in the bag being controllable for heating the compartment to a selected temperature.

* * * * *